Feb. 18, 1958 ELSIE-MIO BROWN 2,823,488
BOOKREST
Filed April 3, 1953 7 Sheets-Sheet 1

INVENTOR.
Elsie-Mio Brown

Feb. 18, 1958         ELSIE-MIO BROWN         2,823,488
                        BOOKREST
Filed April 3, 1953                        7 Sheets-Sheet 2
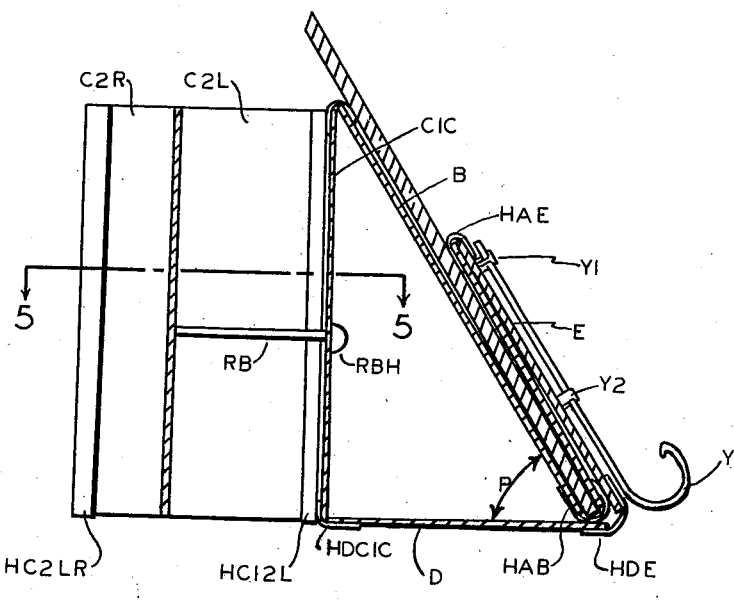
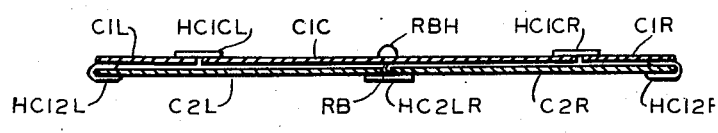
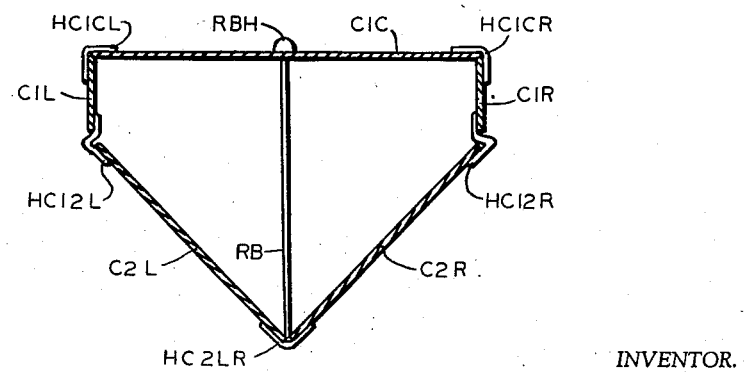
INVENTOR.
Elsie Mio Brown Feb. 18, 1958 ELSIE-MIO BROWN 2,823,488
BOOKREST
Filed April 3, 1953 7 Sheets-Sheet 3

INVENTOR.
Elsie-Mio Brown

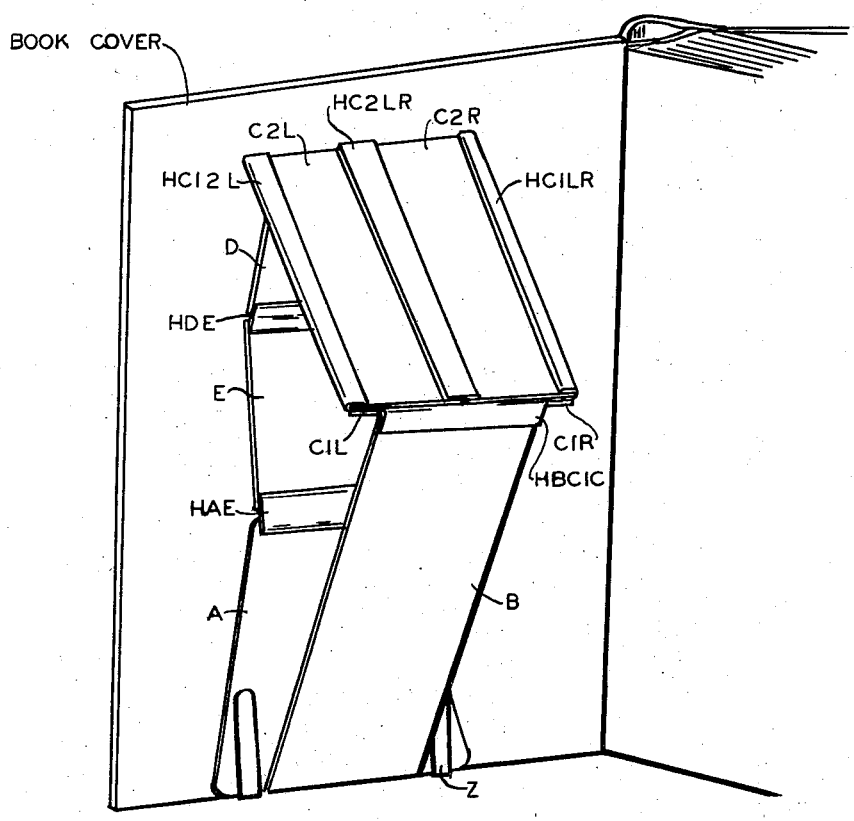

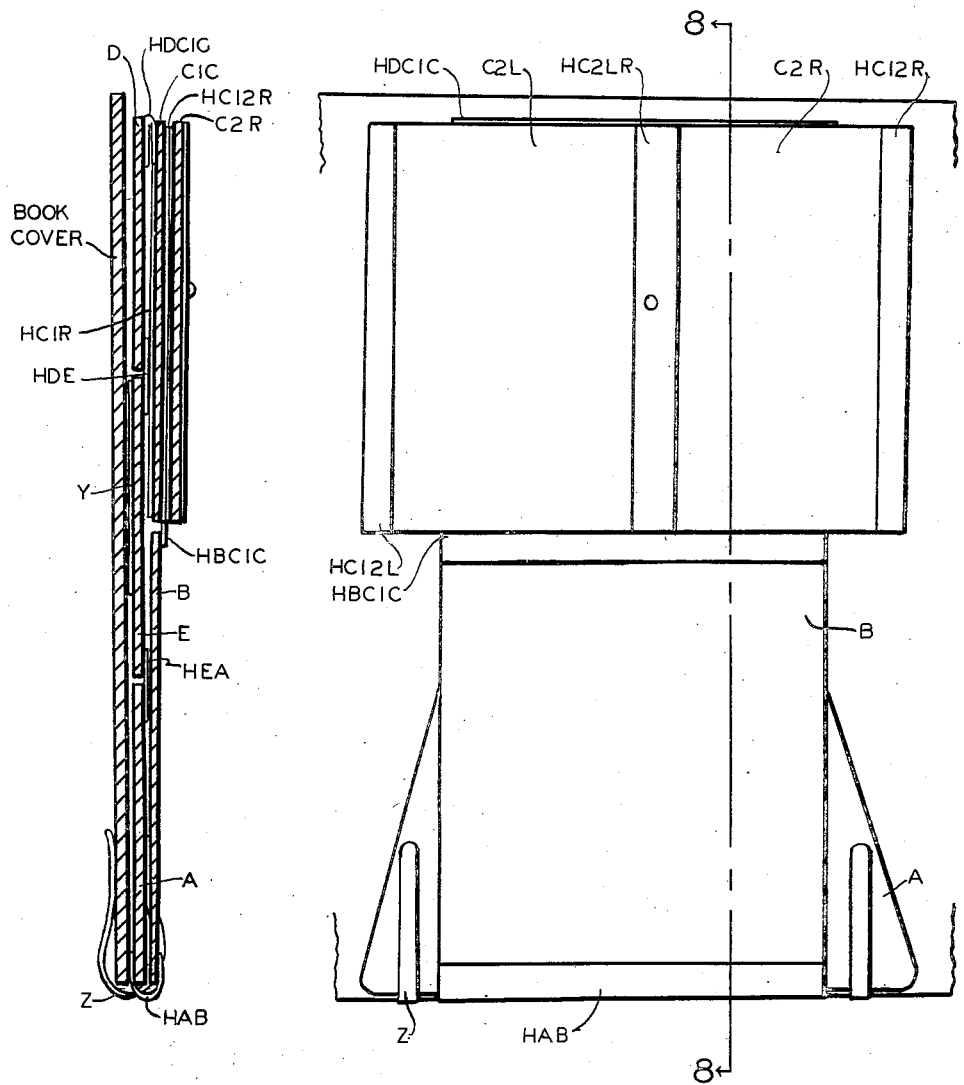

Feb. 18, 1958　　　ELSIE-MIO BROWN　　　2,823,488
BOOKREST
Filed April 3, 1953　　　　　　　　　　　7 Sheets-Sheet 6

INVENTOR.
Elsie Mio Brown

Feb. 18, 1958 ELSIE-MIO BROWN 2,823,488
BOOKREST
Filed April 3, 1953 7 Sheets-Sheet 7

INVENTOR.
Elsie-Mio Brown

United States Patent Office 2,823,488
Patented Feb. 18, 1958

2,823,488

BOOKREST

Elsie-Mio Brown, Washington, D. C.

Application April 3, 1953, Serial No. 346,679

19 Claims. (Cl. 45—57)

My invention relates to improved collapsable bookrests for rigidly supporting books in inclined position and more particularly to such a device which is secured to a book.

An object of my invention is to provide an improved bookrest sufficiently simple, sturdy and inexpensive to permit fixed or removable provision of a pair of such devices on each book, one on each cover.

Another object is the provision of such a bookrest that may be readily folded into a flattened position within the covers of a book.

A further object of my invention is to produce a sturdy bookrest that may be made integral with a book cover or subsequently attached to the cover in a simple manner, or removably attached to the cover in a simple manner.

To facilitate the display as well as the use of books, another object of my invention is to provide an improved bookrest suitable for supporitng a closed as well as an open book in inclined position.

A further object of my invention is the provision of simple sturdy means for holding the pages against the covers of a book when the book is supported in open position by the improved bookrest of my invention.

My invention embodies the concept of a bookrest that can be made economically and can be readily folded away into the book. Specifically, this concept is made workable by arranging that the support member of the bookrest itself be supported by a rigid strong structure, such rigid strong structure resulting not so much from the strength of the material used, but largely from the shape of the supporting structure. For purposes of convenience, the bookrest panels which form the structure must be flat enough to fold away within the book. But for purposes of usefulness the device must be rigid. Generally when panels are used which are flat, they do not have any strength and bend and sag, whereas when panels are made thick enough to not bend and sag, they are so thick that they do not conveniently fold into the book. My invention accomplishes the desired results of forming a rigid structure by using flat pieces so arranged in relation to each other as to cooperatively form a rigid structure, much stronger than any individual flat sheet of similar material; however, this rigid structure readily is unfolded to a flattened narrow shape conveniently folded within the covers of the book and is readily unfolded to form a rigid supporting structure when needed. This invention does not require expensive materials and is made from common stiffened paper, such as is found in 3" x 5" filing cards each approximately 1/100 of an inch thick. A bookrest made as each of Figures 10–A and 10–C formed from 3" x 5" filing cards designed as in Table 1 (wherein the dimensions are listed) for a book of dimensions of 7½" x 5½" x 1" weighing one pound (Palgrave, The Golden Treasury, 1932, Walter J. Black, New York) also supports a book 9" x 6" x 1½" weighing 2⅜ pounds (over 1,200 pages; Student's Milton, edited by Frank Allen Patterson, 1946, F. S. Crofts, & Co., New York). Light metal sheets, flat plastic sheets, or metals of thickness as is used in tin cans can be used for the flat members shown in Figs. 10–A, B, and C. The hinges are of linen or plastic or other flexible material or can be metal hinges. The flexible hinges may be reinforced by stiff thin wire running along the length of the hinge.

Other objects and advantages will be made manifest in the following description taken in connection with the accompanying drawings in which:

Fig. 2 is a cross section view of the bookrest on line 2—2 of Fig. 5.

Figs. 3 and 4 are diagrammatic views of the bookrest.

Figs. 6 and 7 are views of the bookrest approaching the collapsible position.

Fig. 8 is a side view of the bookrest in the folded position.

Fig. 9 is a front view of the bookrest shown in Fig. 8.

Figures 10, 10A:
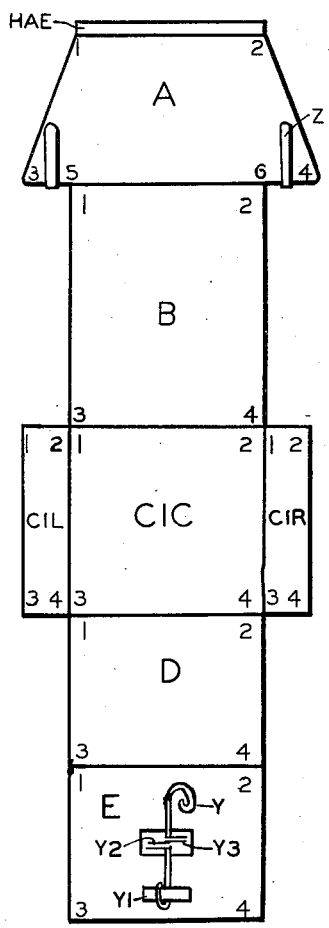

Figs. 10–A, 10–B, and 10–C are pattern views of the bookrest.

Figure 11:
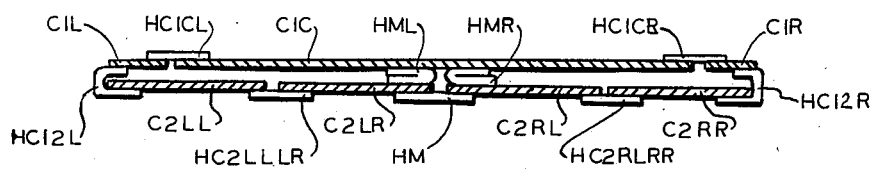
Figure 12:
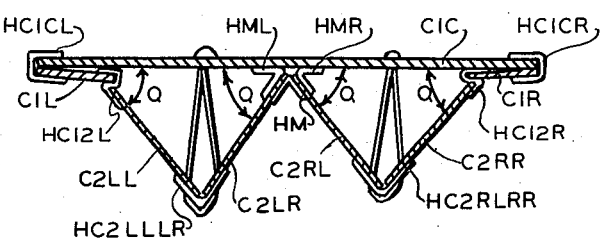

Figs. 11 and 12 are views showing the bookrest in collapsed and supporting positions.

Figs. 13 to 18 illustrate sections of the bookrest connected by hinge tape.

Figure 1:
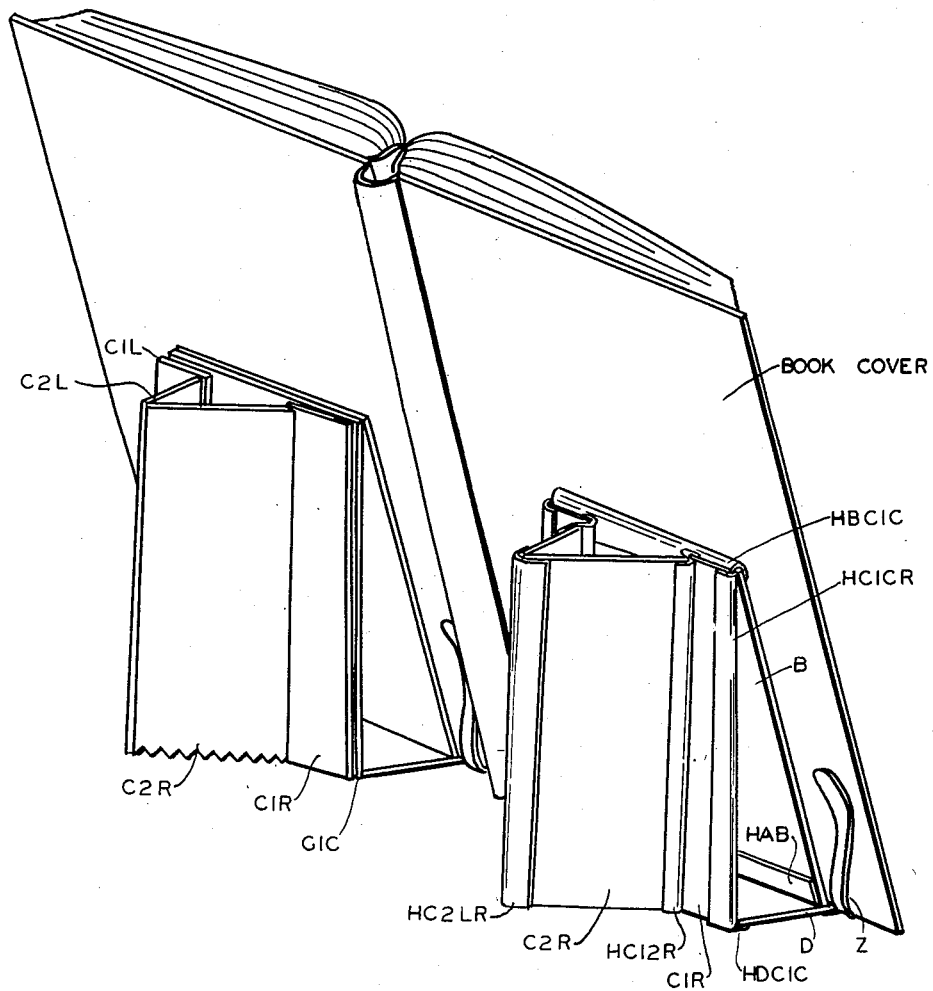
Fig. 1 is a perspective view of an open book being supported by a preferred embodiment of my invention.

Figure 1 depicts an open book being supported (*a*) on the right by a bookrest with its hinges in place; and (*b*) on the left by a similar bookrest, but without any hinging shown so that the simplicity of the basic pieces used can readily be seen. A sample pattern is given in Figures 10–A, 10–B and 10–C which show the relationship of the various pieces except for the connecting hinges; the hinges are shown in Figures 1, 2, 5, 6, 8, and 12, amongst others.

Figure 2 depicts the relationship of the various pieces which form the bookrest when the bookrest is in an operative position to support the book. To show the relationship readily, a cross section of the bookrest is shown; the parts in this figure are shown as if the bookrest was sliced along a plane noted as plane 2—2 in Figure 5.

Figure 5:
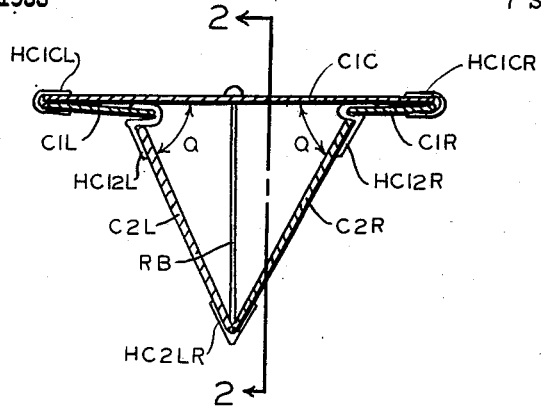
Figure 5 is a view of the bookrest on line 5—5 Fig. 2.

Figure 3, Figure 4, and Figure 5 indicate the successive positions of the pieces of the rigid vertical member supporting structure in passing from a flattened position as in Figure 8 to an open operative supporting position for the book. In Figure 3, the supporting structure is at a flattened closed position. In Figure 4, it is opened somewhat, but not yet in an operative supporting position. Figure 5 is a view through plane 5—5 of Figure 2. In Figure 5, the supporting structure is in a position to support panel C–1–C, the hinges, aided by rubber band RB, lock the support so as to make the total structure strong and rigid. Pieces C–1–C, C–1–L, C–2–L, C–2–R, C–1–R are connected by hinges H–C–1–C–L, H–C–1–2–L, H–C–1–2–R, H–C–2–L–R, and H–C–1–C–R, and have a rubber band (RB) to pull the pieces together. The rubber band, used as tension member between C–1–C and the fold formed by C–2–L and C–2–R meeting, helps to keep the pieces in set position. Rubber band holder RBH holds rubber band or other tightening or tension element in place on piece C–1–C. The fold formed by C–2–L and C–2–R may be a hinge as shown in the figures or may be just a plain straight vertical fold on the panel material.

Figure 6:
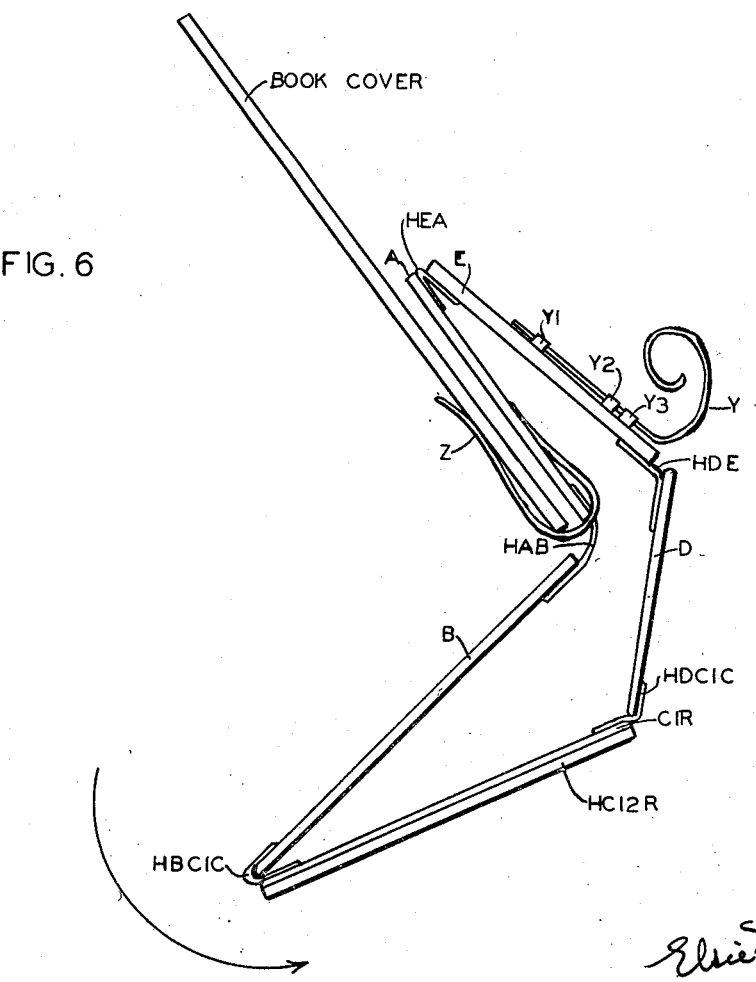

Figure 6 shows the rigid strong supporting structure at a flattened position as was in Figure 3, but in relation to the pieces A, B, D, and E when the bookrest is being put into a flattened position so that it will easily be folded into the covers of the book. The arrow points to the general rotating direction of hinge H–B–C–1–C when passing from the open book supporting position (Figure 2) to the flattened carrying position (Figure 8). This Figure 6 also shows two clamps Z and Y. Thereby the entire structure, i. e. the entire bookrest structure, is attached to a book by means of a pair of clamps attached to the lower end of the member A above described. Each clamp Z, usually flattened curved and springy, is attached to piece A and holds the bookrest and the cover of the book together, unless glue is used to attach piece A to the cover of the book. Clamp Y is a springy J-shaped wire attached to piece E in such a manner as to allow the J-shaped wire to rotate to the position shown in Figure 2 in order that the wire can serve to hold the pages of the book down. (For details of J-shaped wire attachment to piece E, see Figure 10A).

Figure 7 shows the bookrest approaching the flattened position within the cover of the book. The rigid supporting structure is at a flattened position as in Figure 3 or Figure 11. The hinge H–B–C–1–C which hinges piece B and piece C–1–C can be seen in this figure.

Figure 8 shows the bookrest in the flattened shape which it takes when its position is within the book cover. The relationship of the pieces can be seen as if sliced through plane 8—8 of Figure 9. This is the position taken when the movement depicted in Figure 6 and almost completed in Figure 7 is completed.

Figure 9 shows the bookrest in the same flattened position as in Figure 8 but viewed from the front instead of the side as in Figure 8.

Figure 10–A, 10–B and 10–C depict sample patterns of the bookrest without the joining hinges. The simplicity of the basic structure of the bookrest becomes apparent in this figure. Attention is called to the position of the clamp Y and the hinges Y–1, Y–2, and Y–3 which hold the clamp Y to piece E. The flexible hinges between the panels shown in Figures 10–A, 10–B and 10–C are illustrated in Figures 1, 2, 5, 7, 8, and 9. Figures 11 and 12 show the collapsed and supporting positions, respectively, of a folding rib structure that has two folding ribs.

The sample pattern shown in Figure 10–A is easily made and attached to the book cover for ready use. Piece C–1–L is on the left of the drawing and projects laterally from the other pieces; when in the flattened position as sown in Figures 7 and 9, the members C–2–L and C–2–R (shown in Figure 10–C) are easily flipped out from the flattened position sown in Figure 3 to form the rigid structure position shown in Figure 5, and the bookrest is brought from the flattened position within the bookcover shown by Figure 8 through the position shown in Figures 7 and 6 to the position shown in Figures 2 and 1. On the other hand, this bookrest is readily put back into a flattened position such as shown in Figures 8 and 9, from the rigid book-supporting relationship shown in Figures 1, 2 and 5, first by moving hinge H–C–2–L–R, away from piece C–1–C as shown in Figures 5 and 4 and then allowing pieces C–1–C, C–2–L, and C–2–R to form a flattened member as in Figure 3 and then passing through the positions shown in Figures 6 and 7.

Piece C–1–C is the member which largely supports the weight of the book when the bookrest is in an open book-supporting position (as shown in Figures 1, 2 and 5, and this piece is perpendicular to piece D which forms the base of the right triangle (as depicted on Figures 1 and 2). Piece C–1–C is made rigid and strong by one ribbing member formed by C–2–L and C–2–R (see Figures 1, 2 and 5) or by two ribbing members formed by C–2–L–L, C–2–L–R, C–2–R–L, and C–2–R–R (see Figures 10–B, 11 and 12). Piece D is attached by hinge H–D–C–1–C to the bottom of piece C–1–C (Figures 2 and 8). Piece B is the hypotenuse of the right triangle formed by C–1–C, D, and B; B is joined by hinge H–B–C–1–C to the top of C–1–C (as illustrated in Figures 2, 6 and 8). Piece A has a larger base than piece B (as seen in Figures 7, 9 and 10–A) and is joined to the top of piece B by hinge H–A–B (as shown in Figures 2 and 6). The area extending laterally on A is used to support each clamp Z, which is located on that area on each side of piece A and clamps the bookrest to the cover of the book. Clamp Z can be made out of metal or plastic. As each clamp Z is in a position lateral to B's edges, the hinges between piece A and piece B will not be affected thereby during the movement of the bookrest from the flattened position to the operative position of supporting a book (as illustrated in Figures 1 and 7). As the cover of the book will be held to the bookrest by clamps on piece A (or if no clamps are used, glued onto the inside cover of the book), the cover side of piece A will be facing the inside of the book cover and thus will not be visible. The reverse side of piece A will not be readily seen as it will be covered by piece B when in a flattened position (as shown in Figure 9), and by piece E when in the book-supporting position (as shown in Figure 2). The top of piece A is of the same width as the bottom of piece E and is hinged to it (as seen in Figure 7). On piece E, a J-shaped clamp Y is attached by hinges Y–1, Y–2, and Y–3 (as shown in Figure 10–A), which permit the clamp Y to rotate into such a position as to hold the pages of the book when the bookrest is in a book-supporting position (as shown by Figures 2 and 6). Piece E is attached to the bottom of piece D (Figures 2, 6, and 7) by a hinge (HDE).

One specific embodiment of my invention for 7½" x 5½" x 1" book would have the dimensions of Table 1, using Figures 10–A and 10–C as reference pattern for each of the bookrest supports on each of the covers.

Note that the distance by which points 3 and 4 on piece A is lateral to points 5 and 6 is not critical except that there should be a sufficient degree of overhand so that clamp Z which clamp on the book cover will not interfere with or be interfered by piece B when piece B is in the book-supporting position as in Figures 1 and 2. In the same way this overhanging results in that there is no interference between the portion of the clamps Z which are within the cover and piece B when B is rotated within the cover as shown in Figure 9. The above figures are only one embodiment of the several relationships possible between length of elements B, C, and D. The relationship of these panel lengths is determined by the desired angle P between the plane of the supported book cover and the supporting surface. As illustrations of the variations between these elements dependent upon the angle P desired, note Table 2 below. Angle P is shown in Figure 2,

TABLE 1

| On Piece | Edges Measured | Measurement, Inches |
|---|---|---|
| A | 1-2 | 3 |
|  | 3-4 | 4½ |
|  | 1-5 and 2-6 | 2¼ |
| B | 1-2 and 3-4 | 3 |
|  | 1-3 and 2-4 | 4 |
| C | 1-2 and 3-4 | 3 |
|  | 1-3 and 2-4 | 3 |
| C-1-R and C-1-L | 1-2 and 3-4 | ⅝ |
|  | 1-3 and 2-4 | 3 |
| C-2-R and C-2-L | 1-2 and 3-4 | 2⅜ |
|  | 1-3 and 2-4 | 3 |
| D | 1-2 and 3-4 | 3 |
|  | 1-3 and 2-4 | 2½ |
| E | 1-2 and 3-4 | 3 |
|  | 1-3 and 2-4 | 2¼ |

TABLE 2
*For a book 7½" x 5½" x 1"*

| Angle P desired between B and D | 60° | 45° | 30° |
|---|---|---|---|
| The distance between points 2 and 4 on pieces: | | | |
| B ................................................ inches | 3⅝ | 4 | 4½ |
| C ................................................ do | 3⅛ | 2¾ | 2¼ |
| D ................................................ do | 2 | 2¾ | 4 |
| E ................................................ do | 2⅜ | 2 | 2⅜ |
| Distance between points 2 and 6 on piece: A inches | 2⅝ | 2 | 2⅝ |

For books of different sizes, corresponding proportional dimensions of panels should be used to obtain the same angle P.

Care should be taken especially that hinges at H–C–1–2–L, H–C–1–2–R, and H–C–2–L–R are strong. Any common method of hinging, tape, or metal hinge can be used. Cardboard, plastic or metal can be used for panelling. In the interest of economy, it should be noted that the material of which the dimensions above are given were made of paper using standard 3" x 5" filing cards, each of the members shown in Figures 10–A, 10–B, and 10–C being only one thickness of each card, which structure is adequate to support a book 7½" x 5½" x 1". This sample bookrest also was found sufficiently strong and rigid to support a book weighing 2⅜ pounds (over twice in weight of the 7½" book for which it was made) whose dimensions were 9" x 6" x 1½" (refer to column 2, lines 7 and 8 for details of the book Student's Milton), using the ribbing element shown in Figures 3, 4, and 5.

Although I have above-shown and described a simple form of my invention, it is understood that many modifications and changes might be made therein. Another type of support for piece C–1–C is shown in Figures 11 and 12. Figures 11 and 12 each correspond to Figures 3 and 5 to show the collapsed and the rigid supporting positions of the folding elements of a folding ribbing structure that has two folding ribs, one ribbing element formed by C–2–L–L and C–2–L–R and the other ribbing element formed by C–2–R–L and C–2–R–R. Note that the central hinge (HMR, HML, HM) is permanently although flexibly affixed to pieces C–1–C, C–2–R–L and C–2–L–R. This two ribbed supporting member lies as flat in its flattened position shown in Figure 11 as does the rigid supporting structure shown in Figures 3 and 5. The structure comprising members C–2–L–L, C–2–L–R, C–2–R–L, and C–2–R–R and associated hinges shown in Figures 10–B, 11, and 12 can be substituted for elements C–2–L and C–2–R in Figures 1, 2, 6, 7, 8, 9, and 10–C. Note that in the rigid book supporting position of the folding ribbing element the angle Q shown in Figures 12 and 5 is equal to or greater than 50 degrees; for purposes of greatest rigidity and strength an angle Q greater than 60 degrees and less than 91 degrees is preferred. The width of pieces C–1–C, C–1–R, C–1–L, and either C–2–L–L, C–2–L–R, C–2–R–L, and C–2–R–R, or C–2–L and C–2–R should be chosen to provide that angle.

The structure corresponding to Figures 3 and 5 is simpler and less expensive to construct than that shown in Figures 11 and 12. However, the bokrest which is shown in Figures 3 and 5 is adequate for most books as noted in the preceding paragraphs. However, where greater strength is desired from a given thickness of a panel, the structure corresponding to Figures 11 and 12 should be used.

My invention also includes making the bottom portion of pieces C–2–L and C–2–R and C–2–L–L, C–2–L–R, C–2–R–R, and C–2–R–L with zigzagged bottom edges as shown in Figure 1, which will permit the bookrest to distribute evenly the weight of the book along the edges of these pieces.

Figure 13:
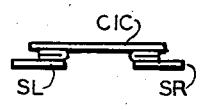
Figure 14:
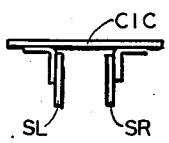
Figure 15:
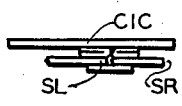
Figure 16:
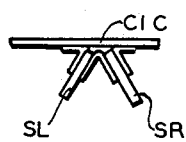
Figure 17:
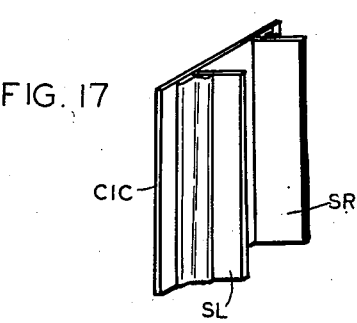
Figure 18:
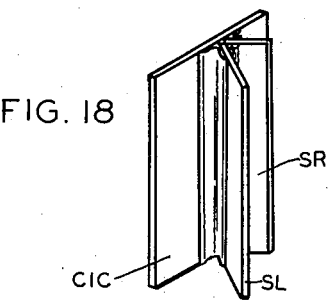

Another type of simple support for panel C–1–C is shown in flattened position in Figures 13 and 15 and in book supporting position in Figures 14, 16, 17, and 18 where S–L and S–R are rectangular pieces of the same height as C–1–C and hinged to it. Although, I have found frequently that the elements that support C–1–C should not be allowed to flap loosely as frequently happens with the structure shown in Figure 13 and Figure 18 but should be positively held as in the structure shown in Figures 1 to 12. The modifications shown in Figures 13 to 18 are merely illustrations of embodiments of my invention which are not the best embodiments. The panels in Figures 13 to 18 are like the other panels shown in the other drawings; these panels are of the same material as are the panels of Figures 1 to 12. These panels shown in Figures 13 to 18 are joined by any common method of hinging, tape, or metal hinge that can be used for the panels in the structures shown in the other drawings and the hinging means are shown in Figures 13 to 18 in the same manner as illustrated in Figures 3, 4, 5, 8, 11, and 12.

I claim as my invention:

1. In a bookrest for supporting a book in inclined position on a relatively horizontal surface, said book having a cover, the combination of foldably and permanently connected panels which includes a rigid compression structure, this rigid structure comprising a first flat panel with a folding rib structure attached thereto, this folding rib structure comprising a flat trapezoidal panel contacting the first flat panel along a first edge of the trapezoidal panel, and being flexibly and permanently connected thereto, and rib structure holding means extending from a second edge of each trapezoidal panel, which second edge is opposite from said first edge, to the first flat panel and which rib structure holding means is permanently and flexibly attached to and rigidly holds the trapezoidal panel in a plane at an angle to the plane of the first panel whereby said flat trapezoidal panel, in the operating position of the bookrest acts as a rib to reinforce and make rigid the first panel; a flat inclined member flexibly joined to the upper edge of said rigid compression structure and extending to the lower edge of a cover of said book; and a further flat horizontal member flexibly joined to the lower edge of said rigid compression structure and extending to the lower edge of said book cover.

2. A structure according to claim 1 wherein the rib structure holding means includes a flat panel which is connected permanently and flexibly to substantially the entire second edge of the trapezoidal panel, and in the operative position of the bookrest compression structure, is at an angle to said trapezoidal panel.

3. A bookrest as in claim 1, in which the folding ribbed structure comprises a rectangular central panel, a pair of rectangular end panels, each of which end panels are of the same height as the central panel and foldably attached to a lateral vertical edge of the central panel, these lateral panels each being narrow in relation to the width of the central panel, and a folded rectangular ribbing element which is foldably attached at its lateral vertical edge to the previously mentioned end panels at the vertical edges thereof distant from the edges along which each end panel is foldably attached to the central panel and which ribbing element is of substantially the same height as those end panels and is urged toward the central panel by an elastic member in its book supporting position, and which ribbing element has a vertical fold in its center, and which ribbing element has a lateral edge which is, when unfolded, the same distance from the center of the central panel as the lateral edges of the end panels.

4. A bookrest as in claim 1 which is made of plastic with soft plastic hinges, or of light metal with metal hinges.

5. A combination as in claim 3 in which the entire bookrest structure is attached to a book by means of a pair of clamps attached to the lower end of a flat primary member foldably attached to the inclined member.

6. A combination as in claim 3 in which the inclined member is joined to a flat secondary member and this secondary member has attached to it a spring member that serves to hold the leaves of a book open and toward the cover.

7. A bookrest as in claim 2 which is made of flat thin cardboard and has cloth hinges glued on each panel, thereby foldably connecting each panel with two adjacent panels.

8. In a pair of bookrests for supporting a book in an inclined position on a relatively horizontal surface, the combination of two bookrests, each of which consists of foldably and permanently connected panels and is attached to a different cover of the same book and one of which bookrests comprises the combination of: a foldable rigid compression structure, this rigid structure comprising a first flat panel with a plurality of folding rib structures foldably attached thereto, each folding rib structure comprising a flat trapezoidal panel attached to the first panel along a first edge of the trapezoidal panel, which trapezoidal panel in the operating position of the bookrest, acts as a rib to reinforce and make rigid the first panel, and holding means extending from a second edge of each such trapezoidal ribbing panel, which second edge is distant from the first edge and which rib structure holding means is permanently and flexibly attached to substantially the entire length of the second edge of each trapezoidal ribbing panel whereby the trapezoidal panel acts as a ribbing element to the first panel when the bookrest is in its booksupporting position, and a second flat member flexibly joined to the upper edge of said rigid compression structure and extending to the lower edge of the cover of said book, and a further flat member extending to the lower edge of the book cover and being attached to the lower edge of primary member attached to the inside surface of said cover, the combined length of said rigid compression structure, said flat member, and said primary member permitting the bookrest to be collapsed into position with the primary member fully extended and disposed flat against the inside surface of said book cover.

9. A bookrest which consists of foldably and permanently attached flat panels for supporting in inclined position a book wherein the leaves are held parallel to an edge which runs from the top to the bottom of the page, and which book has on the outside thereof a front and a back cover each bound or held to the pages by an edge thereof which runs from the top to the bottom of the cover; and which bookrest in its operative book-supporting position is in part located on the outside of the book below the cover of said book and between the book cover and a relatively horizontal supporting surface; and which bookrest includes a first flat trapezoidal panel and a second flat trapezoidal panel which is ribbed, and which first flat panel in its operative position is foldably attached to the cover of the book through a foldable material, which foldable material passes from within the cover of the book around the bottom edge of the cover of the book to foldedly attach to the bottom edge of the first trapezoidal panel of the bookrest, which first panel, in the operative position of the bookrest, is parallel to and adjacent to the outside of the cover of the book supported by the bookrest and which first panel is attached along its edge which is substantially parallel to the bottom edge of the book cover and distant therefrom the distance of the length of the first trapezoidal panel, by a strip of foldable material to the top edge of a second flat panel which second flat panel in the operative position of the bookrest forms an acute angle between the plane of the above-mentioned first panel and the plane of the second panel, and said second flat panel, hereafter called the ribbed second panel, is strengthened by at least two other flat trapezoidal panels, each called hereafter a ribbing element, each ribbing element contacting and being foldably and permanently attached through the first edge thereof to the ribbed second panel along a line in the plane of the second panel which line is substantially complete and substantially the full length of the second panel and at an angle approximately 90 degrees to the line of attachment between the first and second panels which line is parallel to the first edge of each ribbing elements adjacent to the ribbed element, and holding means extending from a second edge of each ribbing panel which is distant from the first edge to that second panel and which holding means firmly holds each ribbing element in a plane at an angle to the plane of the second panel when the bookrest is in its booksupporting position.

10. A bookrest as in claim number 9, which bookrest is one of a pair of like bookrests and each of which bookrests is foldably attached to only one cover of said book; and each of which bookrests is not connected with the other support for the book except by having the book it supports and the horizontal support in common.

11. A bookrest as in claim number 9 and each of which is adapted to foldably collapse to a flattened position between the book cover and the pages of said book.

12. A bookrest as in claim number 9 and which bookrest is adapted to foldably collapse to a flattened position between the book cover and the pages of said book which bookrest is made of panels each less than 1/16" thick which panels are foldably joined to each other.

13. A bookrest as in claim number 9 in which a ribbing element in the operating book-supporting position of the bookrest, projects rearwardly from the ribbed element.

14. A bookrest as in claim number 9 in which at least one such ribbing panel is foldably attached to the ribbed panel along a line in the plane thereof approximately perpendicular to the line of the fold joining the first and second panel.

15. A bookrest as in claim 9 in which the ribbing panel is positively held when the bookrest is in its operative book-supporting position by means including an elastic locking means.

16. A bookrest as in claim number 9, in which each ribbing element in operative-book-supporting position of the bookrest projects rearwardly from the ribbed panel and the ribbing element is trapezoidal and at least one such ribbing panel is hingedly attached to the ribbed panel along a line approximately perpendicular to the line of the fold joining the first and second panel; and each ribbing panel is positively held when the bookrest is in its operative book-supporting position by a locking means, the locking means comprising a plurality of flat trapezoidal panels in a permanently and foldably connected series, the first of these panels being permanently and foldably attached to each corresponding ribbing panel along substantially the entire second edge of the ribbing panel which second edge is parallel to the first edge of the ribbing panel and is distant from the attachment of the ribbed panel to the ribbing panel, and the last of the series of the locking panels being comprised of a trapezoidal flat panel connected to the ribbed panel along a line parallel to the line of attachment of the ribbed panel and the ribbing panel.

17. A bookrest as in claim number 15 and where such locking means comprise serrated edges along the bottom of the ribbed member.

18. A bookrest as in claim number 15 and where such locking means comprise a plurality of flat panels in series, the first of the series foldably attached to the ribbing panel at points removed from the ribbed panel, the last of the series foldably attached to the ribbed panel and the panels in the series foldably connected to each other.

19. A bookrest as in claim number 12 in which at least two ribbing elements each comprising a trapezoidal flat panel are hingedly attached to the ribbed panel and the lines of attachment to the ribbed panel of at least two of these ribbing panels are adjacent to each other.

References Cited in the file of this patent

UNITED STATES PATENTS

| | | |
|---|---|---|
| 527,694 | Jones | Oct. 16, 1894 |
| 1,167,031 | Ullrich | Jan. 4, 1916 |
| 2,225,830 | Harris | Dec. 24, 1940 |
| 2,573,191 | Finch | Oct. 30, 1951 |

FOREIGN PATENTS

| | | |
|---|---|---|
| 248,666 | Great Britain | Apr. 11, 1926 |